United States Patent [19]

Tanaka et al.

[11] Patent Number: 5,482,782
[45] Date of Patent: Jan. 9, 1996

[54] SLIDING-CONTACT MATERIAL EXCELLENT IN CORROSION RESISTANCE AND WEAR RESISTANCE, AND METHOD OF MANUFACTURING THE SAME

[75] Inventors: Tadashi Tanaka; Masaaki Sakamoto; Koichi Yamamoto; Tsukimitsu Higuchi; Kouki Ozaki, all of Nagoya, Japan

[73] Assignee: Daido Metal Company Ltd., Nagoya, Japan

[21] Appl. No.: 350,013

[22] Filed: Nov. 29, 1994

[30] Foreign Application Priority Data

Dec. 28, 1993 [JP] Japan .................................. 5-336533

[51] Int. Cl.⁶ .................................................. B22F 5/00
[52] U.S. Cl. ......................... 428/553; 428/546; 428/548
[58] Field of Search ................................. 419/12, 28, 43; 428/546, 548, 553

[56] References Cited

U.S. PATENT DOCUMENTS

| | | | |
|---|---|---|---|
| 4,121,928 | 10/1978 | Mori | 419/3 |
| 4,579,712 | 4/1986 | Mori | 419/9 |
| 4,758,404 | 7/1988 | Muto | 419/3 |
| 5,256,494 | 10/1993 | Tanaka et al. | 428/552 |

FOREIGN PATENT DOCUMENTS

| | | | |
|---|---|---|---|
| 4198440 | 7/1992 | Japan | C22C 9/02 |
| 5-279772 | 10/1993 | Japan | C22C 9/04 |

*Primary Examiner*—Donald P. Walsh
*Assistant Examiner*—John N. Greaves
*Attorney, Agent, or Firm*—Browdy and Neimark

[57] ABSTRACT

A sliding-contact material comprising a backing steel plate optionally plated with Cu, and a layer of sintered copper alloy formed on one of the surfaces of the backing steel plate, wherein the layer of sintered copper alloy consists essentially of 4 to 20 wt % Sn, 1 to 10 wt % Ni, 0.05 to 1 wt % B, and balance of Cu and incidented impurities, and does not practically include P, and the sintered copper alloy has a Vickers hardness not less than Hv 100.

9 Claims, 2 Drawing Sheets

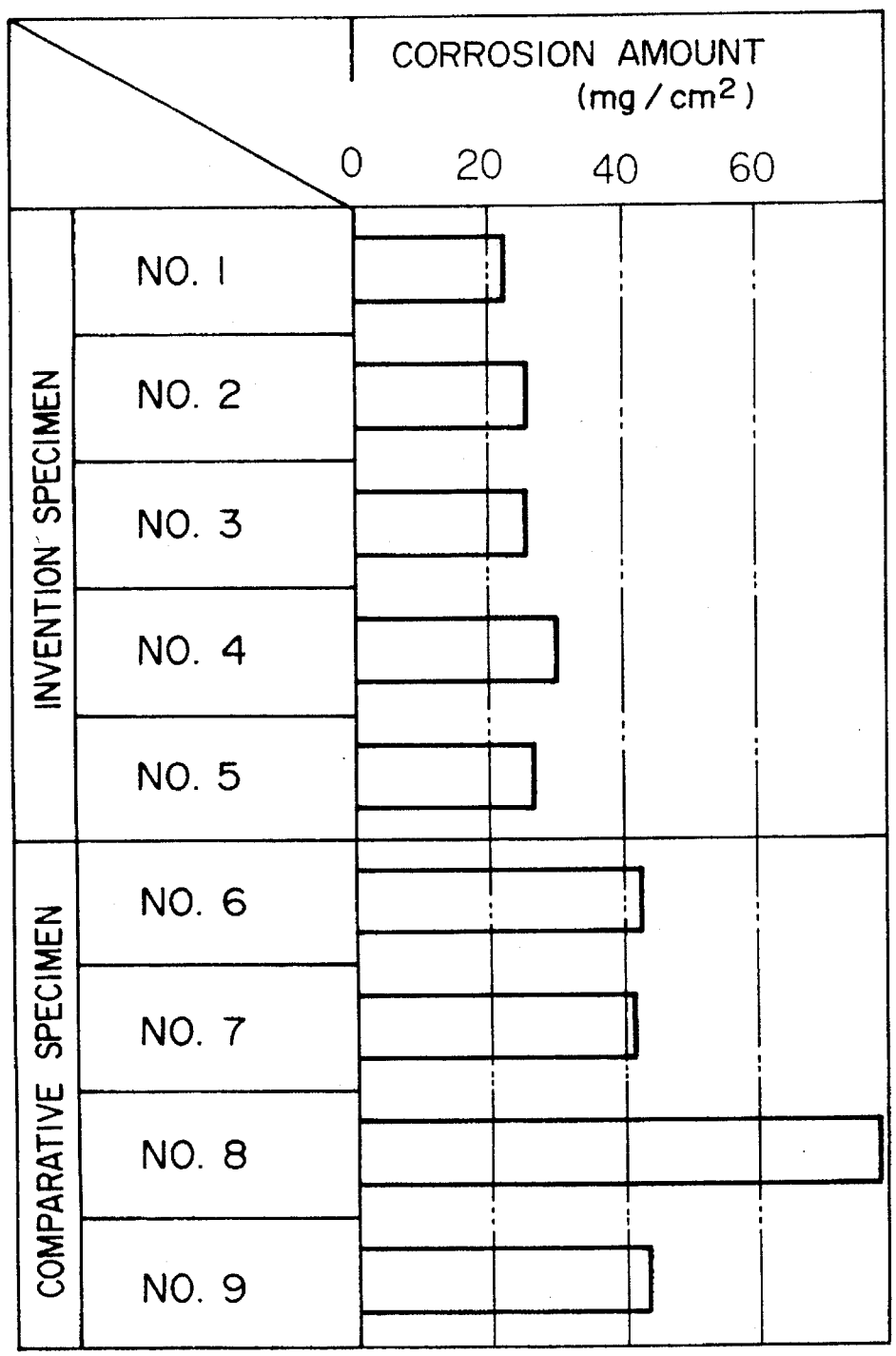

SLIDING-CONTACT MATERIAL EXCELLENT IN CORROSION RESISTANCE AND WEAR RESISTANCE, AND METHOD OF MANUFACTURING THE SAME

BACKGROUND OF THE INVENTION

The present invention relates to a multi-layered sintered material which is suitable for sliding-contact members, washers and the like used in motor vehicles, industrial machines and agricultural machines, and which is excellent in corrosion resistance and wear resistance, and improved in wear resistance in a boundary lubrication state under severe lubrication conditions, and to a method of manufacturing the same.

Conventional multi-layered sintered materials for the above-mentioned bushes, washers and the like are mainly bronze or lead bronze. Those alloys have favorable sliding performances when they are used in a condition where lubricating oil exists. In a boundary lubrication state under severe conditions, however, wear resistance of the foregoing alloys is inferior, and an adequate sliding property can not be obtained. According to the previous suggestion from the engineers of DAIDO METAL Co., Ltd. including the present inventors, the wear resistance and also the lubrication performance can be improved by adding Ni-B compound, which are hard compounds, and graphite to the conventional bronze and lead bronze alloys (see JP-A-4-198440).

Recently, in order to reduce the friction loss, lubricating oil containing sulfur has been used. When a material is used in such a highly corrosive lubrication environment, sulfur corrosion of the copper alloy matrix occurs and affects the sliding property unfavorably, which results in a demand for producing materials which have corrosion resistance as well.

SUMMARY OF THE INVENTION

In the light of the above technical background, there is provided a high-strength multi-layered sintered material which is more excellent in corrosion resistance and wear resistance in a highly corrosive environment under boundary lubrication conditions.

The inventors found that when the conventional material is used in a highly corrosive lubrication environment containing sulfur, sulfur corrosion of the copper alloy matrix easily occurs because the conventional alloy includes P (phosphorus) which promotes sulfur corrosion of the copper alloy matrix. Also, the inventors found that when Ni—B is added, P combines with B (boron) and produces brittle compounds, thereby affecting the sliding-contact property unfavorably. This problem can be solved by providing a sintered copper alloy not substantially containing P which causes the above-mentioned sulfur corrosion but containing Ni and B which form hard compounds, the sintered copper alloy layer having a Vickers hardness not less than Hv 100.

According to a first aspect of the present invention, there is provided a sliding-contact material excellent in corrosion resistance and wear resistance, comprising a backing steel plate optionally plated with Cu, and a layer of sintered copper alloy formed on one of the surfaces of the backing steel plate, wherein the sintered copper alloy layer has a composition consisting essentially of 4 to 20 wt % Sn, 1 to 10 wt % Ni, 0.05 to 1 wt % B, and balance of Cu and incidental impurities, and the sintered copper alloy layer has a Vickers hardness (Hv) not less than 100.

According to a second aspect of the invention, there is provided a sliding-contact material excellent in corrosion resistance and wear resistance, wherein the sintered copper alloy layer further includes 0.1 to 12 wt % Pb.

According to a third aspect of the invention, there is provided a sliding-contact material excellent in corrosion resistance and wear resistance, wherein the sintered copper alloy layer further includes 0.1 to 3 wt % graphite.

According to a fourth aspect of the invention, there is provided a sliding-contact material excellent in corrosion resistance and wear resistance, wherein the sintered copper alloy layer further includes 0.1 to 10 wt % Pb and 0.1 to 2 wt % graphite.

According to a fifth aspect of the invention, there is provided a sliding-contact material excellent in corrosion resistance and wear resistance, wherein the proportion of Ni and B is such that B occupies 5 to 15 wt % of the total amount of Ni and B, the balance being Ni.

According to a sixth aspect of the invention, there is provided a manufacturing method of the foregoing high-strength sliding-contact material excellent in corrosion resistance and wear resistance, wherein powder of the copper alloy is spread on a backing steel plate optionally plated with Cu, and the backing steel plate is repeatedly sintered and rolled so that its reduction at the time of the final rolling operation is 3 to 12%, thereby forming the sintered copper alloy layer having a Vickers hardness not less than Hv 100.

BRIEF DESCRIPTION OF THE DRAWINGS

FIG. 2 is a graph showing results of corrosion tests of the invention specimens and the comparative specimens.

DETAILED DESCRIPTION OF THE INVENTION

Figure 1:
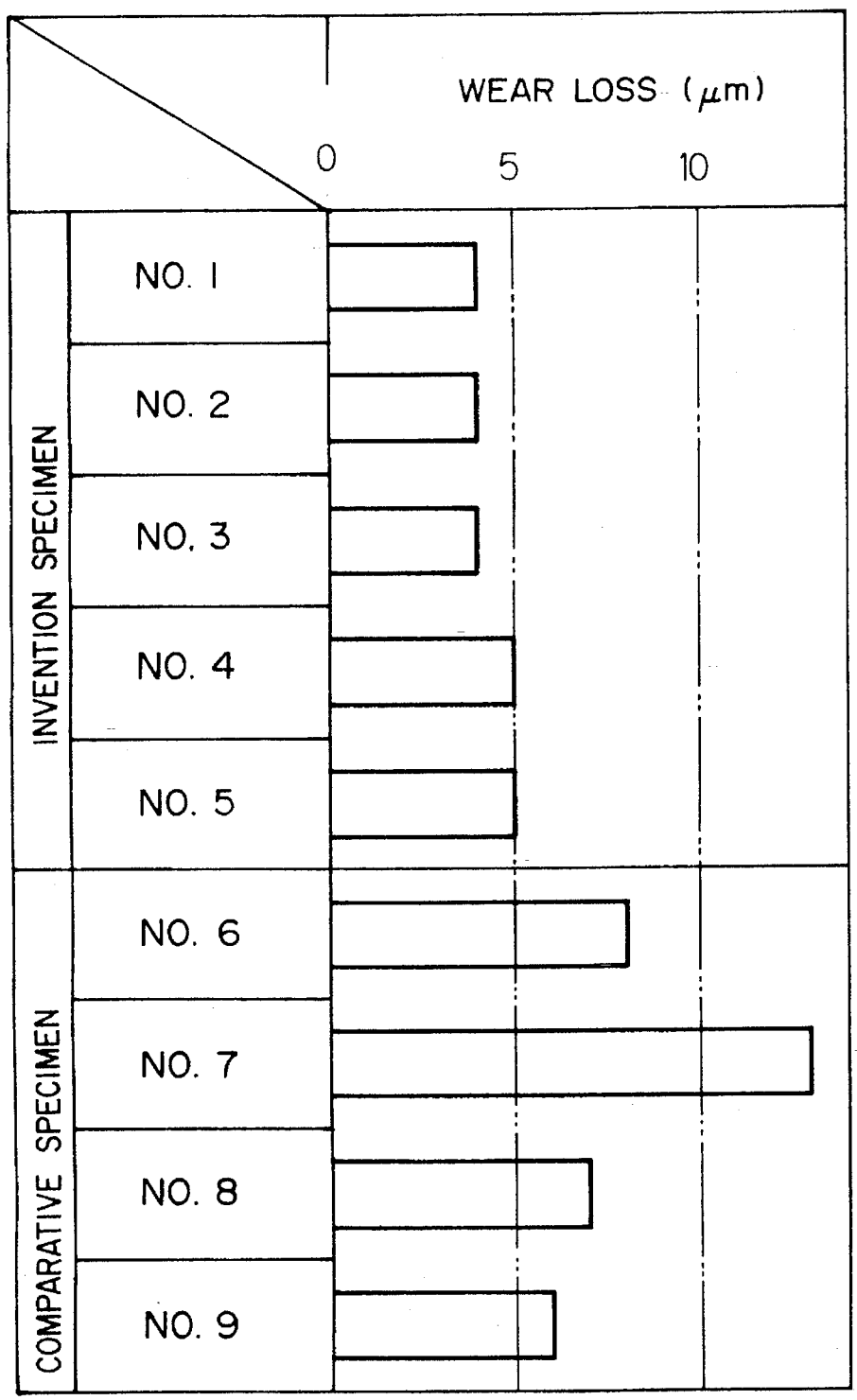
FIG. 1 is a graph showing results of wear tests of invention specimens and comparative specimens.

The reasons for determining amounts of component elements included in a multi-layered sintered material according to the present invention will now be described.

a) Sn (4 to 20 wt %)

Sn is alloyed with Cu and strengthens the matrix. When the Sn content is less than 4 wt %, the matrix strength is lowered and the wear resistance is deteriorated. When it exceeds 20 wt %, the alloy becomes brittle. More preferably, the Sn content is 5 to 18%.

b) Ni (1 to 10 wt %)

When the Ni content is less than 1%, the alloy strength is lowered. When it exceeds 10%, the alloy becomes excessively hard, thus deteriorating the conformability as a bearing with respect to a shaft as its sliding mating member.

c) B (0.05 to 1.0 wt %)

B (boron) is present in the form of a compound with Ni, and increases a degree of sintering and improves strength and wear resistance of the alloy. Hardness of the Ni-B compound is not less than Hv 1000. When the B content is less than 0.05%, an amount of the Ni—B compound is small, and when it exceeds 1.0%, the foregoing effect can not be obtained. Moreover, hardness of the alloy excessively increases and degrades the toughness, also raising the manufacturing costs.

d) Pb (0.1 to 12 wt %)

Pb contributes to lubrication as a soft element. When the Pb content is less than 0.1%, the effect of addition can not be obtained, and when it exceeds 12 wt %, the alloy strength is lowered.

e) Graphite (0.1 to 3 wt %)

Graphite is a self-lubricative component. When the graphite content is less than 0.1%, the effect of addition can not be obtained. When it exceeds 3 wt %, the alloy strength is drastically lowered, and the alloy becomes brittle. More preferably, the graphite content is 0.2 to 2.5 wt %.

f) Pb (0.1 to 10 wt %) and graphite (0.1 to 2 wt %)

Pb contributes to lubrication as a soft element, and graphite is a self-lubricative component. Addition of Pb over 10 wt % when it coexists with graphite results in a decrease of the alloy strength, and addition of graphite over 2 wt % when it coexists with Pb results in a decrease of the alloy strength. When the Pb content or the graphite content is less than 0.1%, the effect of addition can not be obtained.

g) Proportion of Ni and B (B: 5 to 15 wt %, Ni: balance)

Preferably, the proportion of Ni and B is such that B occupies 5 to 15 wt % of the total amount of Ni and B, the balance being Ni. When B occupies less than 5% of the total amount of Ni and B, Ni in the uncombined form is present in addition to the Ni—B compound, thereby deteriorating the performance as a wear-resistant material. When B occupies more than 15%, B is present in addition to the Ni-B compound, and lowers a degree of sintering of the copper alloy.

h) Rerolling reduction (3 to 12%)

The hardness can be improved by enhancing the re-rolling reduction. When the re-rolling reduction is less than 3%, the hardness as a bearing is insufficient, and when it exceeds 12%, the effect does not vary. More preferably, the re-rolling reduction is 5 to 10%.

Example:

Powders of alloy components of specimens 1 to 5 shown in Table 1 were mixed. The powder mixtures in layers of uniform thickness were put on steel plates which had been plated with Cu in advance, and were heated and sintered in a hydrogen gas atmosphere at 700 (973 k) to 900° C. (1173k) for 10 to 30 minutes. The composite materials after sintering were rolled, re-sintered and re-rolled. By rolling, density and hardness of the sintered copper alloy layers were increased, and the composite materials having a predetermined thickness were obtained. The re-rolling rates are shown in Table 1. Re-sintering is heat treatment in which the specimens are heated in a hydrogen gas atmosphere at 700 to (973 k) 900° C. (1173k) for 10 to 30 minutes so as to increase binding forces of the sintered copper alloy layers. The composite sliding-contact members thus obtained had an overall thickness of 1.60 mm, a thickness of 0.49 mm in the sintered copper alloy layer, and a width of 150 mm. With these materials, bushes having an inner diameter of 20 mm, a length of 20 mm and a thickness of 1.5 mm were manufactured to investigate the friction wear properties.

The specimens 1 to 5 are composite sliding-contact members according to the present invention. Specimens 6 to 9 are comparative materials manufactured by the same process of the invention specimens. Mechanical properties (hardness, tensile strength, bonding strength between the backing steel plate and the sintered copper alloy layer) of the sliding-contact members were inspected. The results are shown in Table 2. Further, tests of wearing properties were performed under boundary lubrication conditions with a decreased amount of oil. Conditions of the wear tests are shown in Table 3, and results of the wear tests are shown in FIG. 1. Moreover, as for corrosion resistance properties, conditions of corrosion tests are shown in Table 4, and results of the corrosion tests by oil containing a large amount of sulfur are shown in FIG. 2.

The invention specimens and the comparative specimens are compared by use of the wear test results shown in FIG. 1. A wear loss of the invention specimen 3 which does not contain P is small, from which it can be understood that the effect of containing no P is produced whereas, in the comparative specimen 6 of similar components including P, P produces brittle compounds with B, so that the wear loss is large. Further, the alloy hardness of the invention specimens which have high rates of re-rolling reduction are not less than Hv 100, and their wear losses are smaller than those of the comparative specimens 7, 8 and 9 of low hardness. From this fact, it can be understood that the invention specimens wear by a smaller degree. Moreover, from the corrosion test results shown in FIG. 2, it can be understood that when the invention specimen 3 which does not contain P is compared with the comparative specimen 6 including P, a corrosion amount of the invention specimen is smaller, and that the effect of containing no P is produced.

According to the present invention, as described heretofore, there can be provided the material which is more excellent in corrosion resistance and wear resistance under severer boundary lubrication conditions.

TABLE 1

| KIND OF SPECIMEN | SPECIMEN NO. | EMPLOYED POWDER | CHEMICAL COMPOSITION (wt %) | | | | | | | RE-ROLLING REDUCTION (%) |
|---|---|---|---|---|---|---|---|---|---|---|
| | | | Cu | Sn | Pb | Ni | B | Gr | P | |
| INVENTION SPECIMEN | 1 | Bronze and "Ni—B" | Bal. | 10 | — | 4.45 | 0.55 | — | — | 10 |
| | 2 | Lead Bronze and "Ni—B" | Bal. | 10 | 4.7 | 4.45 | 0.55 | — | — | 8 |
| | 3 | Lead Bronze and "Ni—B" and Gr | Bal. | 10 | 4.7 | 4.45 | 0.55 | 1.0 | — | 3 |
| | 4 | Lead Bronze and "Ni—B" | Bal. | 10 | 10 | 1.7 | 0.3 | 1.0 | — | 8 |

TABLE 1-continued

| KIND OF SPECIMEN | SPECIMEN NO. | EMPLOYED POWDER | CHEMICAL COMPOSITION (wt %) | | | | | | | RE-ROLLING REDUCTION (%) |
| --- | --- | --- | --- | --- | --- | --- | --- | --- | --- | --- |
| | | | Cu | Sn | Pb | Ni | B | Gr | P | |
| | 5 | Lead Bronze and "Ni—B" and Gr | Bal. | 10 | 4.7 | 9.5 | 0.5 | 2.0 | — | 8 |
| COMPARATIVE SPECIMEN | 6 | Lead Bronze and "Ni—B" and Gr | Bal. | 10 | 4.7 | 4.45 | 0.55 | 1.0 | 0.2 | 8 |
| | 7 | Lead Bronze | Bal. | 10 | 10 | — | — | — | 0.2 | 0 |
| | 8 | Phosphorus Bronze | Bal. | 11 | — | — | — | — | 0.2 | 8 |
| | 9 | Lead Bronze and Gr | Bal. | 11 | 5 | — | — | 1.0 | 0.2 | 8 |

*Note:
Gr means graphite.

TABLE 2

| KIND OF SPECIMEN | SPECIMEN NO. | CHEMICAL COMPOSITION (wt %) | | |
| --- | --- | --- | --- | --- |
| | | ALLOY HARDNESS (Hv) | TENSILE STRENGTH N/mm² (Kg/mm²) | BONDING STRENGTH BETWEEN BACKING STEEL PLATE AND ALLOY LAYER N/mm² (Kg/mm²) |
| INVENTION SPECIMEN | 1 | 157 | 441 (45) | 294 (30) |
| | 2 | 152 | 392 (40) | 274 (28) |
| | 3 | 132 | 294 (30) | 196 (20) |
| | 4 | 125 | 274 (28) | 225 (23) |
| | 5 | 145 | 245 (25) | 176 (18) |
| COMPARATIVE SPECIMEN | 6 | 140 | 196 (20) | 147 (15) |
| | 7 | 73 | 235 (24) | 176 (18) |
| | 8 | 81 | 294 (30) | 186 (19) |
| | 9 | 74 | 255 (26) | 176 (18) |

TABLE 3

(WEAR TEST CONDITIONS)

| ITEM | |
| --- | --- |
| BEARING DIMENSIONS: | INNER DIAMETER 20 MM LENGTH 20 MM |
| TEST LOAD: | ACCUMULATION OF EVERY 5 MPa |
| NUMBER OF REVOLUTIONS: (PERIPHERAL SPEED) | 1000 r.p.m. (1.0 m/s) |
| TEST TIME: | ACCUMULATION OF EVERY 15 min. |
| OIL CLEARANCE: | 0.025–0.060 mm |
| LUBRICATING OIL: | SAE #10 |
| LUBRICATING OIL TEMPERATURE: | ROOM TEMPERATURE |
| LUBRICATING OIL SUPPLY: | 2 cm³/min. |
| SHAFT MATERIAL: | JIS S55C |
| SHAFT SURFACE ROUGHNESS: (Rmax) | 1.0 μm |

TABLE 3-continued (WEAR TEST CONDITIONS)

| ITEM | |
| --- | --- |
| SHAFT HARDNESS: | 500–700 Hv (10) |

TABLE 4

| EMPLOYED OIL: | 80W-90LS (S:3.29 wt %, P: 0.24 wt %) |
| --- | --- |
| TEMPERATURE: | 130° C. (403k) |
| TEST TIME: | 1000 hours |

What is claimed is:

1. A sliding-contact material excellent in corrosion resistance and wear resistance, comprising a backing steel plate optionally plated with Cu, and a layer of sintered copper alloy formed on one of the surfaces of the backing steel plate, wherein said sintered copper alloy consists essentially of 4 to 20 wt % Sn, 1 to 10 wt % Ni, 0.05 to 1 wt % B, and balance of Cu and incidental impurities, and said sintered copper alloy has a Vickers hardness not less than Hv 100 and is essentially devoid of P.

2. A sliding-contact material excellent in corrosion resistance and wear resistance according to claim 1, wherein the copper alloy further comprises 0.1 to 12 wt % Pb.

3. A sliding-contact material excellent in corrosion resistance and wear resistance according to claim 1, wherein the copper alloy further comprises 0.1 to 3 wt % graphite.

4. sliding-contact material excellent in corrosion resistance and wear resistance according to claim 1, wherein the copper alloy further comprises 0.1 to 10 wt % Pb and 0.1 to 2 wt % graphite.

5. A sliding-contact material excellent in corrosion resistance and wear resistance according to claim 4, wherein the proportion of Ni and B is such that B amount is 5 to 15 wt % of the total amount of Ni and B, the balance being Ni.

6. A sliding-contact material excellent in corrosion resistance and wear resistance according to claim 3, wherein the proportion of Ni and B is such that B amount is 5 to 15 wt % of the total amount of Ni and B, the balance being Ni.

7. A sliding-contact material excellent in corrosion resistance and wear resistance according to claim 2, wherein the proportion of Ni and B is such that B amount is 5 to 15 wt % of the total amount of Ni and B, the balance being Ni.

8. A sliding-contact material excellent in corrosion resistance and wear resistance according to claim 1, wherein the proportion of Ni and B is such that B amount is 5 to 15 wt % of the total amount of Ni and B, the balance being Ni.

9. A sliding-contact material according to claim 1 in the form of a washer or brush, in contact with a lubricating oil which contains sulphur.

* * * * *